Dec. 25, 1962     H. F. McKENNEY     3,070,406
AIR BEARINGS
Filed Feb. 11, 1960
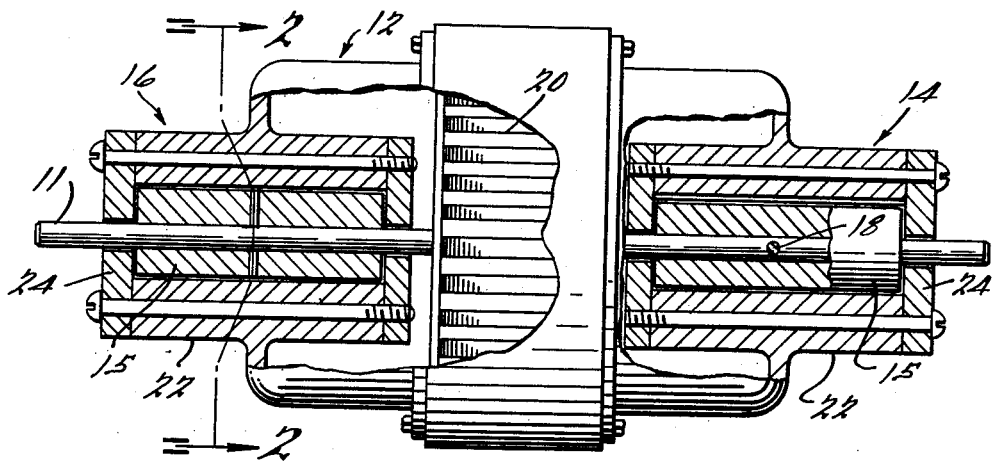
FIG. 1.
FIG. 2.
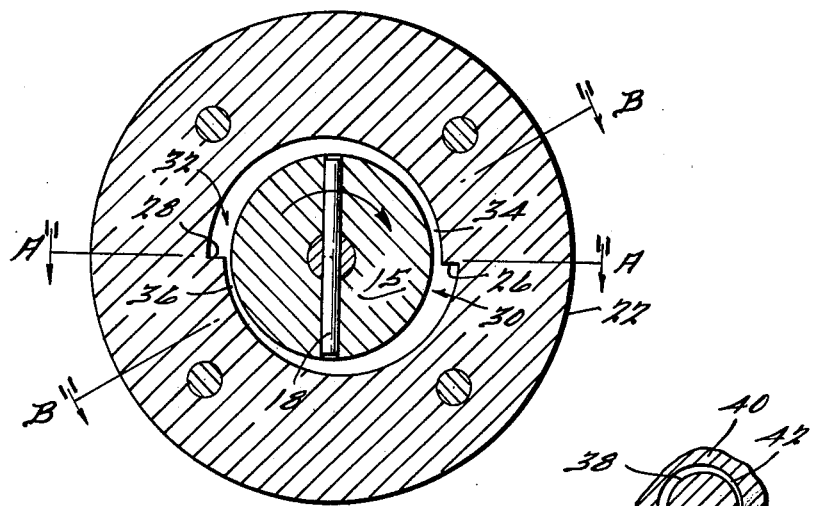
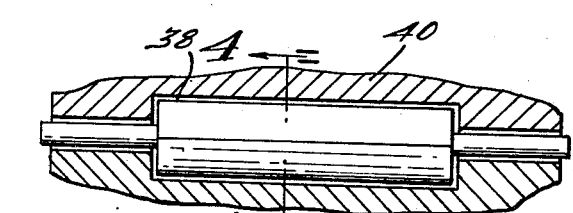
FIG. 3.
FIG. 4.
INVENTOR.
Henry F. McKenney.
BY Harness and Harris
ATTORNEYS.

United States Patent Office 3,070,406
Patented Dec. 25, 1962

3,070,406
AIR BEARINGS
Henry F. McKenney, Bloomfield Hills, Mich., assignor to Chrysler Corporation, Highland Park, Mich., a corporation of Delaware
Filed Feb. 11, 1960, Ser. No. 8,173
2 Claims. (Cl. 308—9)

This invention relates to air bearings which may be used in apparatus such as gyroscopes wherein a minimum of frictional bearing resistance is required and also wherein a substantially complete absence of frictional heat is required.

The air bearing of the present invention is of a type which does not use any source of compressed air or any compressed gas other than that air which is naturally in the space between the rotor and housing. This application is related to copending application of Donald O. Bard, filed February 1, 1960, Serial No. 5,715.

In this invention, either of the relatively movable members, that is the rotor or the housing, may be provided with offset peripheral portions to provide wedge-shaped, air compression spaces between the members which spaces cause the rotor to be suspended on an air cushion within its housing when a certain speed of rotation of the rotor is attained. The same result is attained when the housing is made the rotatable member.

It is noted that the compression pockets will become filled with whatever fluid surrounds the system utilizing these bearings, for example water or oil, and the rotor will be supported on a cushion of that particular fluid in the same manner as though the fluid were a gas. However, gases provide an attractive medium for gyroscopic application and because of this, particular emphasis is directed thereto in this application.

A significant advantage over the prior art types of air bearings is that the present bearing requires no outside source of compressed air, but, instead compresses its own air for floating the rotor within the housing. Since the rotor actually does float within the housing there is no frictional engagement of the rotor therewith and the heat developed by the bearing is practically non-existent.

A further advantage of the wedge bearing configuration is that the clearance between the rotor and stator may be set larger than in a conventional air bearing and yet attain equivalent stiffness. Because of this it is expected that substantial manufacturing economies may be expected through the use of the wedge bearing.

Another advantage is that the manufacturing tolerances of the present bearing do not have to be held as close as those of a conventional bushing type bearing.

A further advantage is that the present bearing provides increased bearing stiffness over other types of hydrodynamic air bearings in that the relative deflection of the rotor and housing is minimized.

A principal object of this invention is to provide a novel type of air bearing which does not require any exterior source of compressed air or gas for its operation.

A further specific object is to provide offset peripheral portions on either the rotor or the housing or on both to produce wedge-shaped fluid compression pockets intermediate the relatively rotatable rotor and housing.

Further objects and advantages of this invention will become apparent from the following description of the drawings in which:

FIGURE 1 represents a partial cross-sectional view of an electric motor having its rotor mounted on air bearings, wherein the section line of the right hand bearing is taken along along a line corresponding to line A—A of FIGURE 2 in the direction of the arrows, and the section line of the left hand bearing is taken along a line corresponding to B—B of FIGURE 2 in the direction of the arrows;

FIGURE 2 represents an enlarged cross-sectional view of an air bearing of FIGURE 1 taken along the line 2—2 in the direction of the arrows;

FIGURE 3 represents a variation of the air bearing of FIGURE 1; and

FIGURE 4 represents a cross-sectional view of FIGURE 3 taken along the line 4—4.

Referring to FIGURE 1, the shaft 11 of an electric motor or electrically driven gyroscope designated 12 is provided at its ends with air bearings 14 and 16 shown in enlarged form for purposes of clarity. Shaft 11 extends between air bearings 14 and 16 and may be formed integrally with the rotors 15 of the bearings or may be secured to the rotors by suitable means such as pins 18. The winding 20 of the motor may be fitted onto the shaft 11 before the bearings 14 and 16 are fitted thereon. This particular use of the air bearings is merely representative of one of the very many uses to which these air bearings lend themselves.

Each of the bearings 14 and 16 comprises a central housing portion 22, end housing portions 24, and a core member or rotor 15. Either the housing or the rotor may be made the rotatable member for certain applications. The particular member which rotates is not critical to the present invention since the same fluid pressure between the two will be developed.

The structure of the central portion of the air bearing housing and rotor is shown to comprise the substantially round rotor member 15, and the peripherally offset housing portion 22. The peripheral offsets 26 and 28 may be produced by boring out the housing 22, dividing it into halves, and thereafter offsetting them slightly along their longitudinal axes to produce the offsets and the wedge-shaped pockets 30 and 32. Another method would be to broach the inside of the housing to the desired shape. The pockets 30 and 32 are shown to be of arcuate wedge-shape with the greatest area adjacent the offsets 26 and 28.

The rotation of the bearing rotor 15 clockwise in FIGURE 2 will cause a relatively high pressure to be developed in the areas approximately designated 34 and 36, which are directly opposite one another along the diameter of the rotor 15 and therefore result in an actual suspension on air of the bearing rotor within its housing. The speed of rotation at which the rotor 15 becomes actually suspended on an air cushion is dependent upon the size of air pockets 30 and 32, the weight and speed of rotation of the rotor 15, and upon other factors which are of only minor importance, such as gas density. However, if a heavier fluid such as oil is employed as the surrounding medium, its density becomes quite significant.

It is particularly noted that the offsets need not be on the housing 22 but, as shown in FIGURES 3 and 4, may be on the periphery of the rotor designated 38 in those figures. The direction of rotation of the rotor in this case to produce necessary pressures for suspending the rotor 38 would be counterclockwise and the high pressure areas would be constantly moving relative to the housing 40 but would be substantially constant along the rotor periphery at the approximate points 42 and 44. In other words, the particular member which moves and its direction of rotation are matters of choice if the net effect of the relative rotation of the two members is to provide within the air pockets pressures necessary to lift the rotor from the bore of the housing, and it would be within the skill of those experienced in the art to further devise modifications and variations in the specific design of the peripheries of either the rotor or the housing without deviating from the scope of this invention. For example, a plurality of offsets could be equidistantly spaced on either the rotor or the housing to produce the pressures required for certain applications. Moreover, in some instances it might be convenient to provide both the rotor and its housing with offsets in their peripheries.

It is particularly noted that the air pockets shown in the drawings are considerably oversized for purposes of description. In actual construction the largest cross-sectional dimension of these pockets is normally below five-thousandths and the problem of excessive frictional engagement of the rotor with the housing at low rotor speeds is not significant even when the rotor rides directly on the housing.

I claim:

1. An air bearing comprising a cylindrical housing having a long bore therein, a rotor shaft journalled for rotation therein, an enlarged cylinder portion of said shaft mounted with a mechanical clearance between its thrust faces and the ends of said housing, said housing having a plurality of lands on the internal circumference thereof parallel to the axis of rotation of said shaft, said lands being progressively greater in height in the direction of rotation of said rotor shaft to form a plurality of wedge-shaped pockets pointing in the direction of rotation of said shaft.

2. An air bearing comprising a cylindrical housing having a long bore therein, a rotor shaft having an enlarged center cylinder portion and reduced diameter end portions journalled for rotation therein, said enlarged cylinder portion of said shaft mounted with a mechanical clearance between its thrust faces and the ends of said housing, said end portions of said shaft having a mechanical clearance from said housing, said housing having a plurality of lands on the internal circumference thereof parallel to the axis of rotation of said shaft and juxtaposed to the radial surface of its said cylinder portion, said lands being progressively greater in height in the direction of rotation of said rotor shaft to form a plurality of wedge-shaped pockets pointing in the direction of rotation of said shaft.

References Cited in the file of this patent

UNITED STATES PATENTS

| | | |
|---|---|---|
| 1,906,715 | Penick | May 2, 1933 |
| 1,980,081 | Ovington | Nov. 6, 1934 |
| 2,014,160 | Bary | Sept. 10, 1935 |
| 2,603,539 | Brewster | July 15, 1952 |
| 2,864,552 | Anderson | Dec. 16, 1958 |
| 2,899,243 | Acterman | Aug. 11, 1959 |
| 2,899,260 | Farrand et al. | Aug. 11, 1959 |
| 2,983,832 | Macks | May 9, 1961 |

FOREIGN PATENTS

| | | |
|---|---|---|
| 514,555 | France | Nov. 16, 1920 |
| 282,484 | Switzerland | Aug. 1, 1952 |